United States Patent [19]

Suzuki et al.

[11] Patent Number: 5,046,064
[45] Date of Patent: Sep. 3, 1991

[54] PACKET SWITCHING SYSTEM

[75] Inventors: Toshio Suzuki; Atsuo Itoh, both of Tokyo, Japan

[73] Assignee: NEC Corporation, Japan

[21] Appl. No.: 471,276

[22] Filed: Jan. 26, 1990

[30] Foreign Application Priority Data

Jan. 27, 1989 [JP] Japan .................................. 1-16224

[51] Int. Cl.$^5$ .............................................. H04J 3/26
[52] U.S. Cl. .................................... 370/60; 370/94.1
[58] Field of Search .................. 370/60, 60.1, 67, 94.1

[56] References Cited

U.S. PATENT DOCUMENTS

| | | | |
|---|---|---|---|
| 4,754,451 | 6/1988 | Eng et al. .............................. | 370/60 |
| 4,760,570 | 7/1988 | Acampora et al. .................... | 370/60 |
| 4,864,560 | 9/1989 | Quinquis ............................ | 370/94.1 |
| 4,884,264 | 11/1989 | Servel et al. ........................ | 370/94.1 |
| 4,891,803 | 1/1990 | Huang et al. ......................... | 370/60 |

OTHER PUBLICATIONS

Alan Huang et al., "A Wideband Digital Switch", IEEE Global Telecommunications Conference Record, 1984.
Y. S. Yeh et al., "The Knockout Switch: A Simple Modular Architecture for High-Performance Packet Switching", IEEE International Switching Symposium, 1987.

Primary Examiner—Douglas W. Olms
Assistant Examiner—Melvin Marcelo
Attorney, Agent, or Firm—Laff, Whitesel, Conte & Saret

[57] ABSTRACT

A switching system transfers information cells from time positions on incoming TDM channels to selected time positions on a particular outgoing TDM channel. Each information cell contains an address which controls the switching and data which is the transmitted message. A first time buffer delays the incoming information cell from the time position which in occupies on the incoming channel to a time position which is appropriate for the switching. After a switching, a second time buffer delays the outgoing signal unit the time position designated by the address. The alignments of the time positions on the outgoing channels are such that there is no conflict if a plurality of switching systems simultaneously feed information cells to the same outgoing channel.

2 Claims, 7 Drawing Sheets

FIG. 4A  TIME DIVISION LINE $15_1$

FIG. 4B  TIME DIVISION LINE $15_2$

FIG. 4C  TIME DIVISION LINE $15_3$

FIG. 4D  TIME DIVISION LINE $15_n$

FIG. 5A  OUTPUT OF SELECTOR $16_1$

FIG. 5B  OUTPUT OF SELECTOR $16_2$

FIG. 5C  OUTPUT OF SELECTOR $16_3$

FIG. 5D  OUTPUT OF SELECTOR $16_m$

FIG. 6A TIME DIVISION LINE $15_1$

FIG. 6B TIME DIVISION LINE $15_2$

FIG. 6C TIME DIVISION LINE $15_3$

FIG. 6D TIME DIVISION LINE $15_n$

FIG. 7A  OUTPUT OF SELECTOR $16_1$

FIG. 7B  OUTPUT OF SELECTOR $16_2$

FIG. 7C  OUTPUT OF SELECTOR $16_3$

FIG. 7D  OUTPUT OF SELECTOR $16_m$

PACKET SWITCHING SYSTEM

BACKGROUND OF THE INVENTION

1. Field of the Invention

The invention relates to a packet switching system for transmitting data by using packets, each having a fixed length. More particularly, the invention is concerned with a packet switching system of the type having time division lines, each being associated with a different input and being provided with a time division multiplex channel associated with an output. A selector means associated with a different output for periodically selecting the time division lines. This type of system switches individual packets to desired outputs, by a self-routing technique.

2. Description of Prior Art

A packet switching system switches packets, each comprising data and an address indicative of a destination of the data. In this system, a plurality of packets meant for the same destination often arrive at the same time. Such an occurence may be coped with by combining a sorting circuit network and a routing circuit network such that a conflicting packet is reinputted into the routing circuit network, as taught by Alan Huang et al in an article entitled "A Wideband Digital Switch" published in 1984 in the IEEE Global Telecommunications Conference Record. Another prior art implementation is the use of switch modules, each being associated with a different output for selecting packets which come in via bus type inputs, as disclosed by Y. S. Yeh et al in an article titled "The Knockout Switch: A Simple, Modular Architecture For High-Performance Packet Switching" published in the Proceedings of the IEEE International Switching Symposium 1987.

However, a problem with the sorting and routing network scheme is that a complicated processing is needed to prevent the order of conflicting packets from being inverted in the event of a reinput. Another problem is that a broadcasting function for simultaneously sending out the same data to a plurality of outputs is not readily practicable.

The modular switch scheme has a disadvantage because switches have to be assigned one-to-one at each of the outputs, resulting in large scale of hardware.

SUMMARY OF THE INVENTION

It is, therefore, an object of the present invention to provide a packet switching system which, with a relatively simple circuit construction, delivers even a plurality of packets which are meant for the same destination and which arrive at the same time at a desired output.

In order to achieve the above object, a packet switching system receives signals in the form of information packets on a plurality of input lines, each packet having a fixed bit length. The received packets include data and an address indicative of a destination of the data. The address switches the packets such that the data are sent to desired destinations, via a plurality of output lines.

The invention comprises:

a plurality of time division lines, each being associated with a respective one of the input lines and having a time division multiplex channel associated with one of the output lines;

a plurality of serial-to-parallel converters, each being associated with a respective one of the input lines for delivering an input packet to an associated one of the time division lines;

a plurality of address filters, each being associated with a respective one of the input lines for identifying one of the output lines to which a packet is destined on the basis of the address of the packet, and indicating a channel position associated with the one output line on associated one of the time division lines;

a plurality of rearranging circuits, each being associated with a respective one of the input lines for rearranging each of the packets on a time axis in response to an indication from an associated one of the address filters, such that each of the rearranged packets is outputted at a particular channel position which is assigned to the packet, and delivering the rearranged packet to an associated one of the time division lines;

a plurality of selectors, each being associated with a respective one of the output lines and being connected to a plurality of the time division lines for periodically selecting and outputting packets on associated ones of the time division lines; and a plurality of parallel-to-serial converters, each being associated with a respective one of the output lines for delivering the packet selected by associated one of the selectors;

all of the time division lines being related with respect to channel positions such that only a single channel that corresponds to one of the output lines exists at any ne position on the time axis, whereby the packets to be fed out to the same output are prevented from conflicting with each other.

BRIEF DESCRIPTION OF THE DRAWINGS

The above and other objects, features and advantages of the present invention will become more apparent from the following detailed description when taken with the accompanying drawings in which.

In the drawings, the same structural elements are designated by like reference numerals.

DESCRIPTION OF THE PREFERRED EMBODIMENTS

Figure 1:
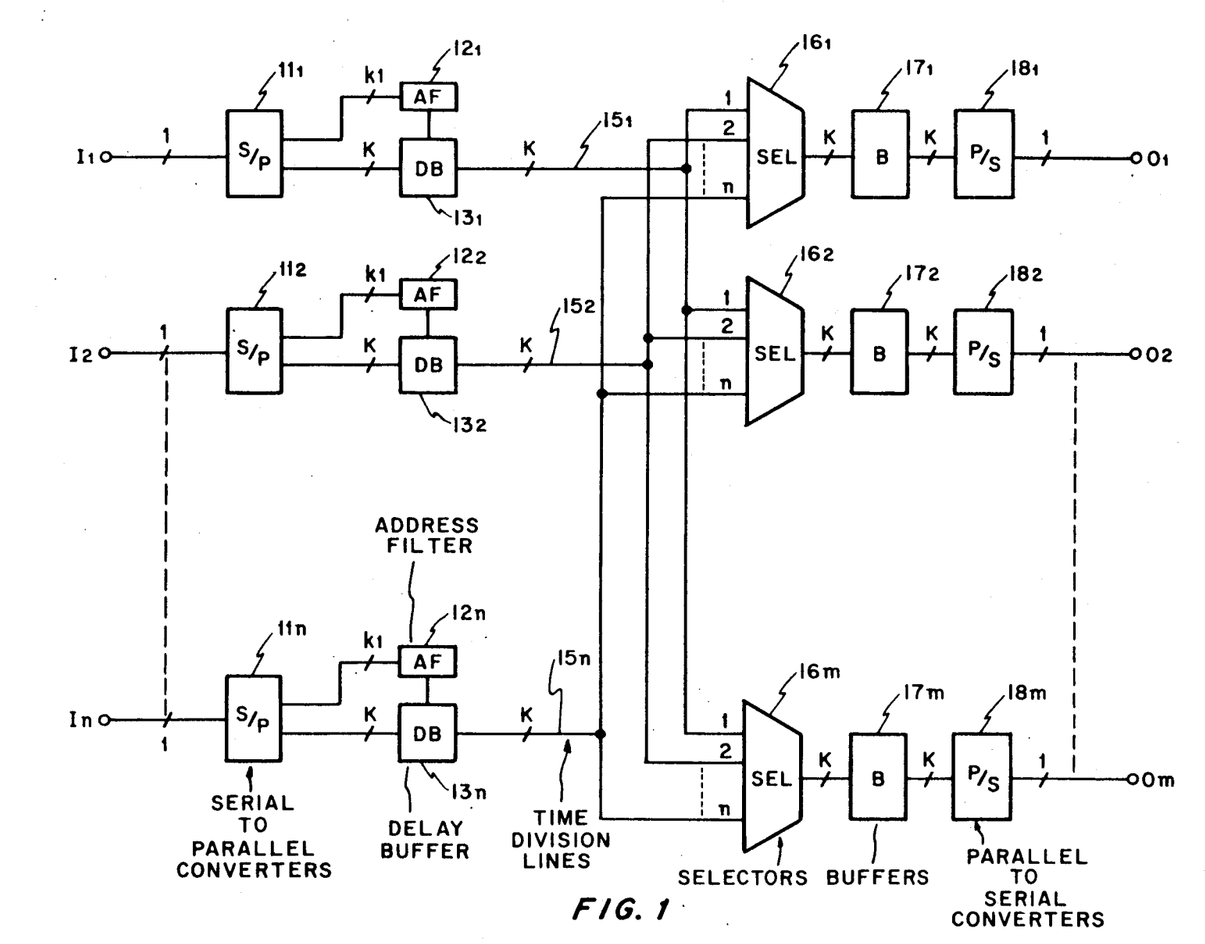
FIG. 1 is a schematic block diagram showing an inventive embodiment of the packet switching system.
Figure 2A:
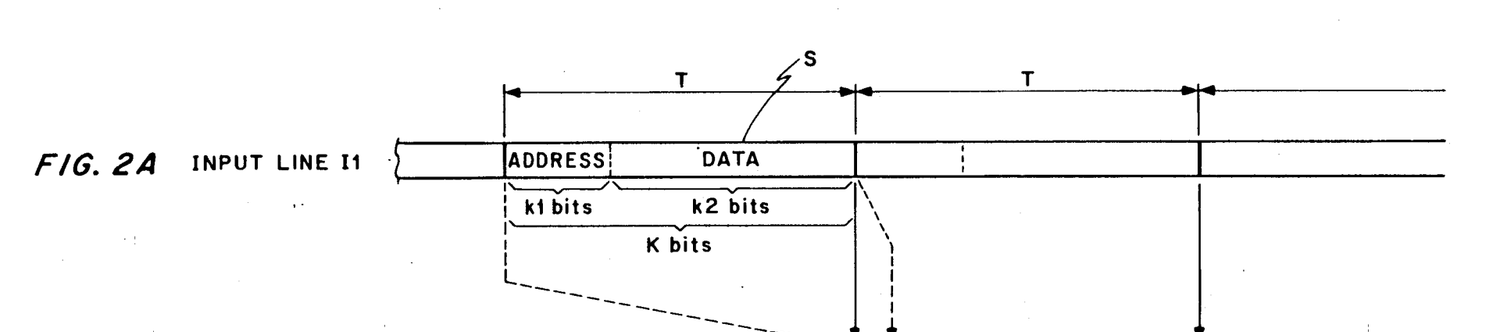
FIGS. 2A, 2B and 2C are timing charts demonstrating a specific operation of the system shown in FIG. 1, which operation occurs on the input side.

Referring to FIG. 1, a packet switching system embodying the present invention is shown in a block diagram. As shown, the system has n inputs $I_1, I_2, \ldots, I_n$ and m outputs $O_1, O_2, \ldots, O_m$. The inputs $I_1$ to $I_n$ are connected to serial-to-parallel (S/P) converters $11_1$ to $11_n$, respectively. As shown in FIG. 2A, each packet has a fixed length (K bits). The packets arrive at each input during every period T of time. Each packet is made up of an address having $k_1$ bits and data having $k_2$ bits.

The S/P (serial-to-parallel) converters $11_1$ to $11_n$ are respectively connected to address filters $12_1$ to $12_n$ for identifying the addresses of individual packets, and delay buffers $13_1$ to $13_n$ for delaying the individual packets based on the results of the identifications of the address filters. The delay buffers $13_1$ to $13_n$ are connected to time division lines $15_1$ to $15_n$, respectively. The time division lines $15_1$ to $15_n$ terminate respectively at corresponding ones of n input terminals of m selectors $16_1$ to $16_m$ which are associated on a one-to-one basis with the outputs $O_1$ to $O_m$. Operated on a time division basis, each of the selectors $16_1$ to $16_m$ sequentially selects the n inputs, one at a time while feeding them out, as will be described in detail later.

The selectors $16_1$ to $16_m$ are connected to series connections of buffers $17_1$ to $17_m$ and parallel-to-serial (P/S) converters $18_1$ to $18_m$, respectively. The P/S converters $18_1$ to $18_m$ are connected to the individually associated outputs $O_1$ to $O_m$, respectively.

Figure 2B:
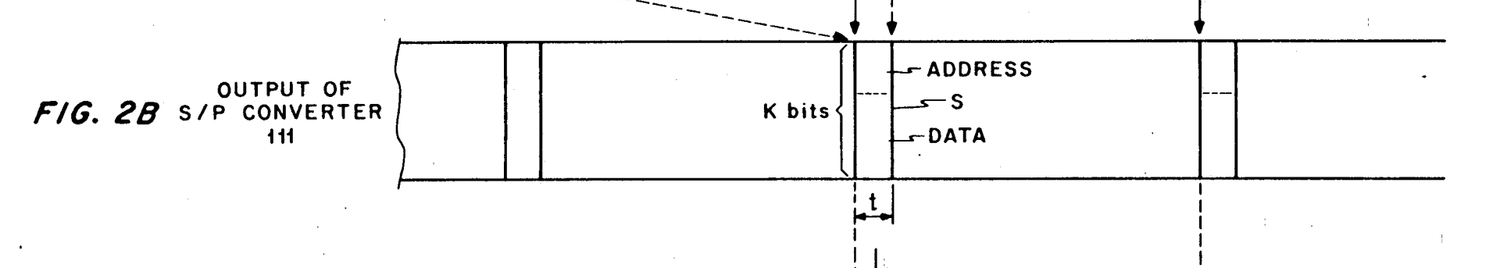
Figure 2C:
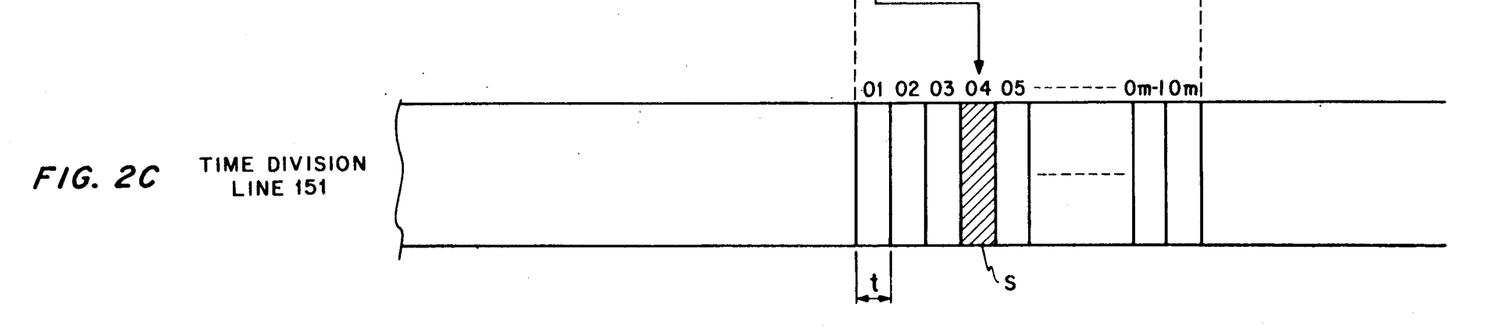

FIGS. 2A to 2C indicate a specific procedure for multiplexing incoming packets by the time division principle. The procedure will be described by taking the input $I_1$ for example and with reference also made to FIG. 3. As shown in FIG. 2A, a packet S having a $k_1$-bit address and $k_2$-bit data arrives at the input $I_1$ during period T. The entire string of bits constituting the packet S is sent in series. When the string of bits arrive at the input $I_1$ (step S1, FIG. 3), it is transformed into parallel data by the associated S/P converter $11_1$ (step S2). The S/P converter $11_1$ may be implemented by a K-bit shift register, for example. The resulting parallel data are shown in FIG. 2B. The S/P conversion is effected so that m (number of outputs) packets can be time-division multiplexed within the packet length period T. Specifically, the packet length period t after the conversion of one packet satisfies the relationship $T \geq mt$. The parallel data representative of the packet S are stored in the delay buffer $13_1$ (step S3).

Figure 3:
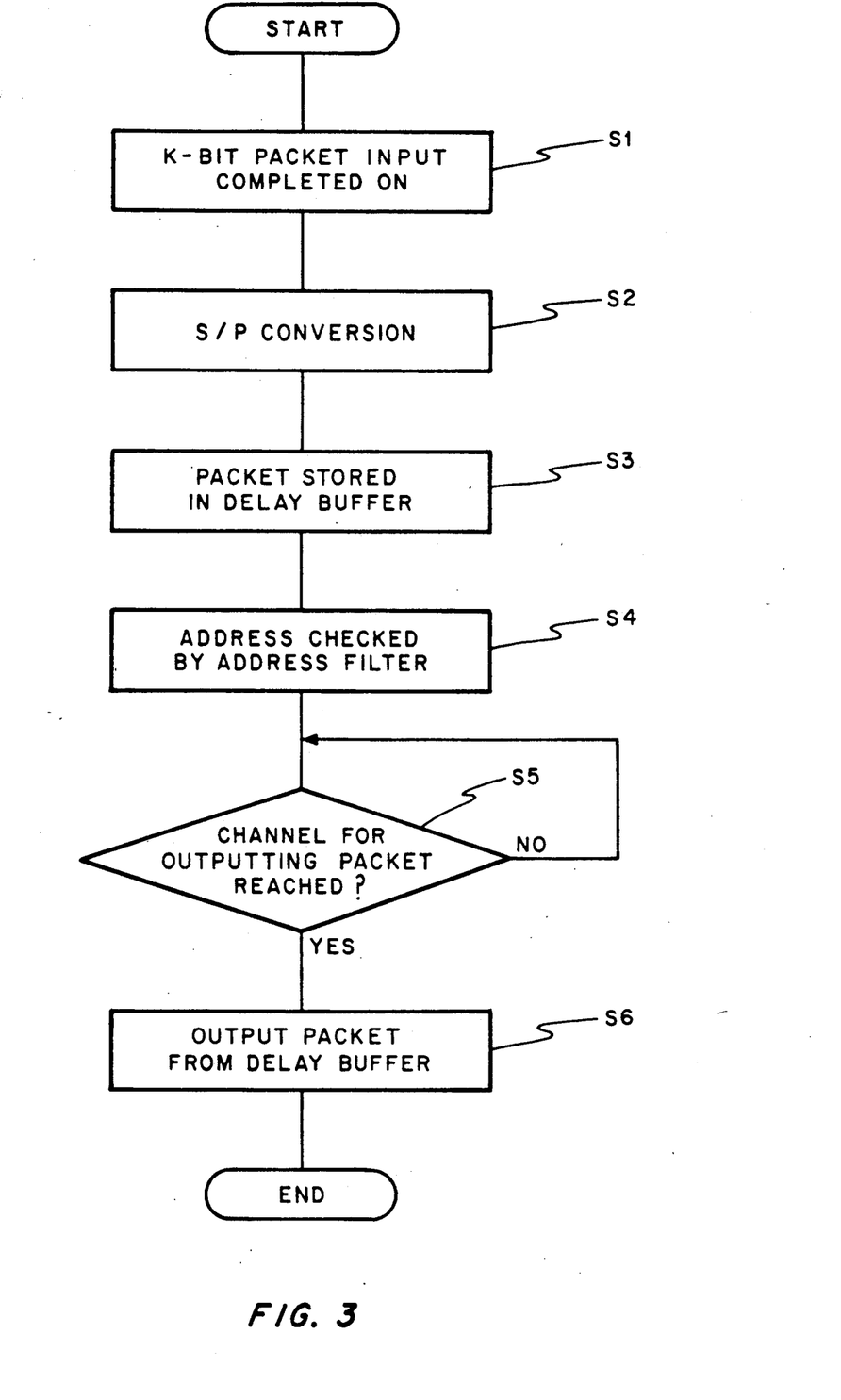
FIG. 3 is a flowchart associated with FIGS. 2A to 2C.
Figure 4A:
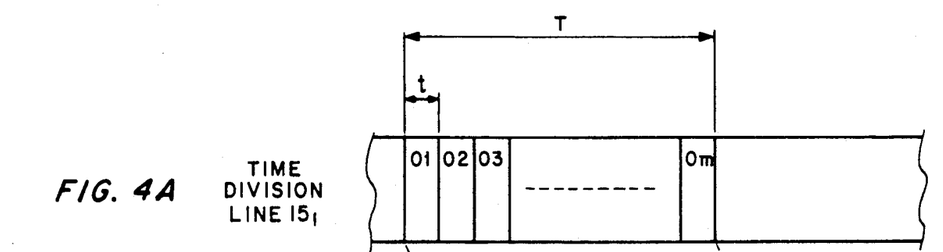
FIGS. 4A, 4B, 4C, and 4D show channel arrangements on time division lines which are included in the system of FIG. 1.
Figure 4B:
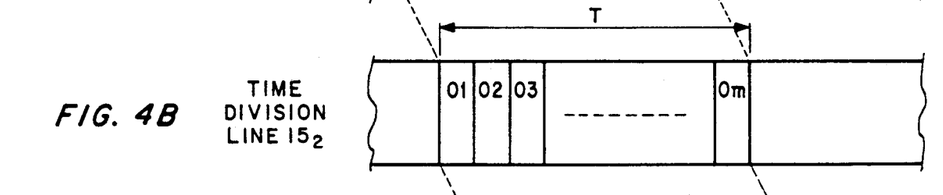
Figure 4C:
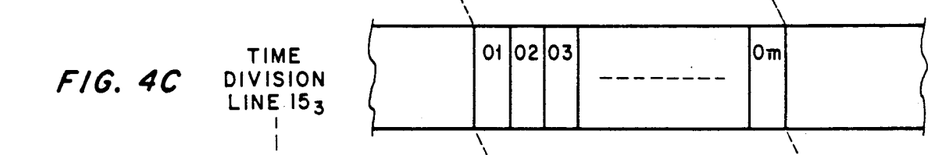
Figure 4D:
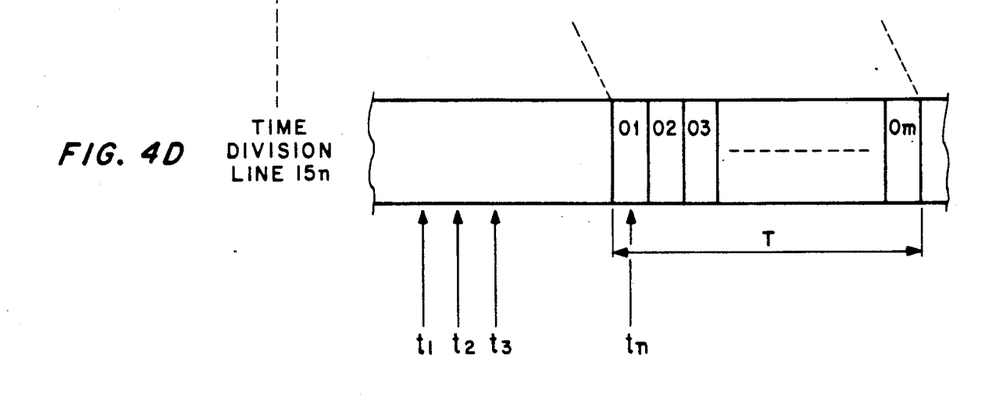
Figure 5A:
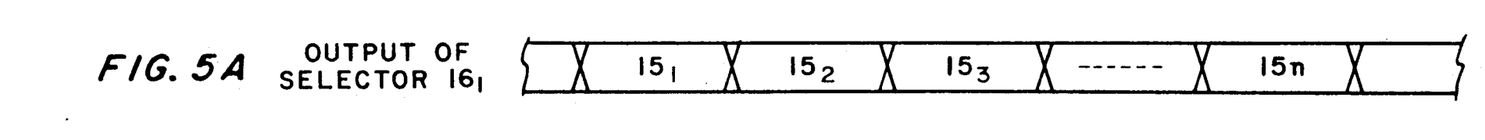
FIGS. 5A to 5D illustrate the operation of selectors shown in FIG. 1.
Figure 5B:
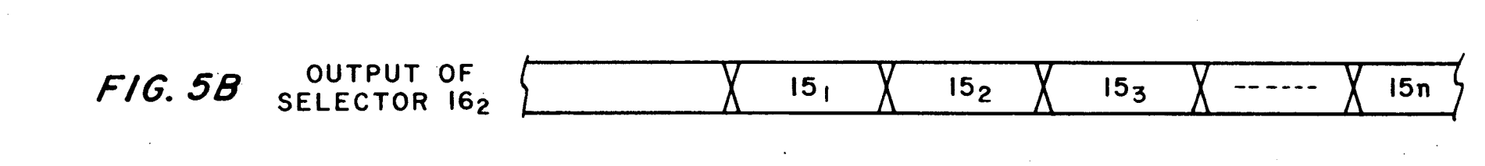
Figure 5C:
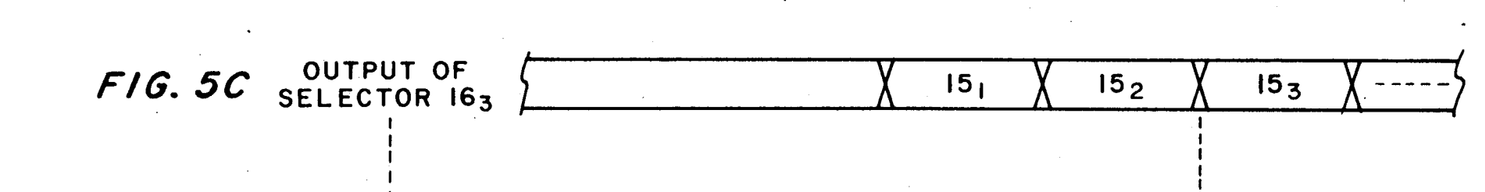
Figure 5D:
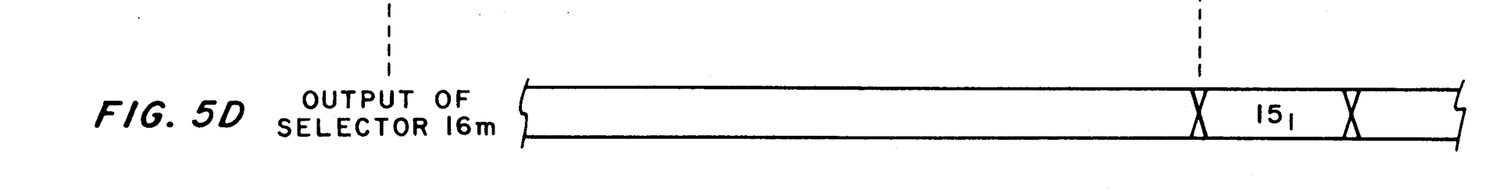
Figure 6A:
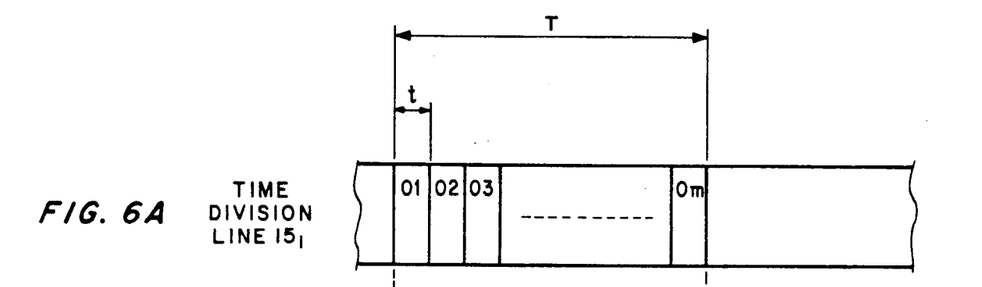
FIGS. 6A to 6D show channel construction on time division lines representative of another embodiment of the present invention.
Figure 6B:
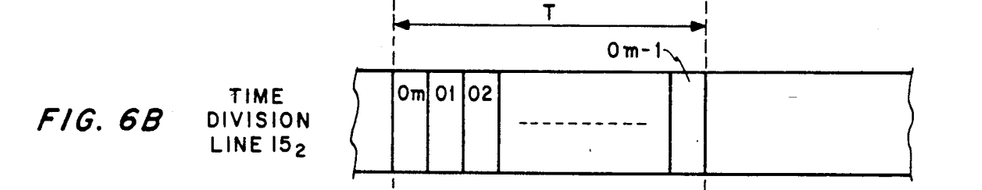
Figure 6C:
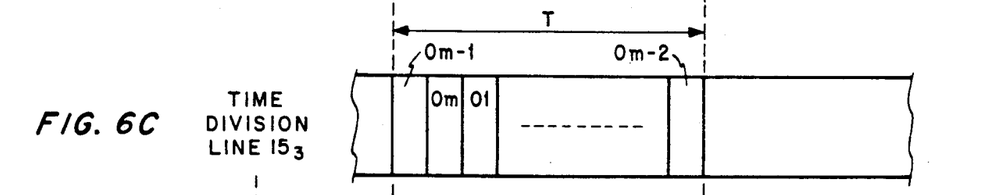
Figure 6D:
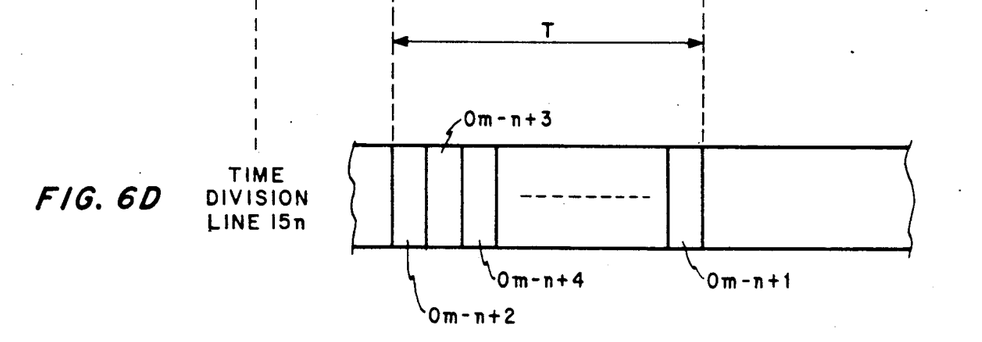
Figure 7A:
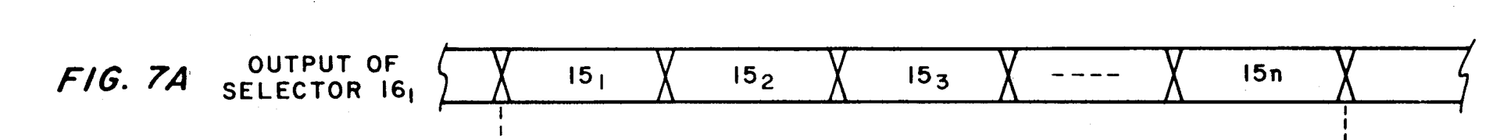
FIGS. 7A to 7D indicate the operation of selectors, which is useful for understanding the embodiment shown in FIGS. 6A to 6D.
Figure 7B:
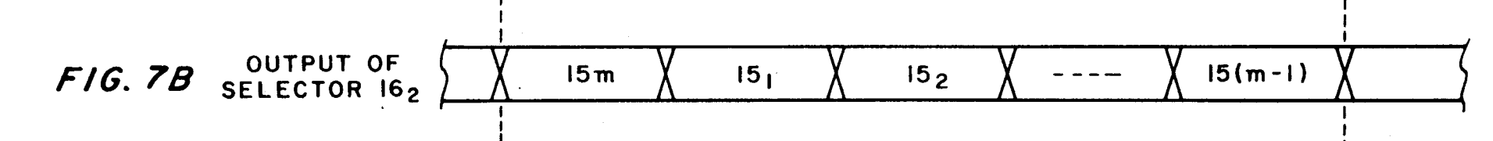
Figure 7C:
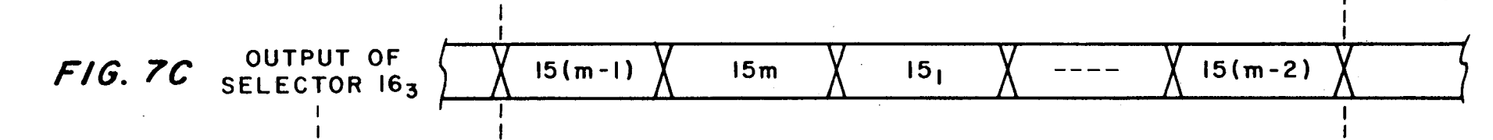
Figure 7D:
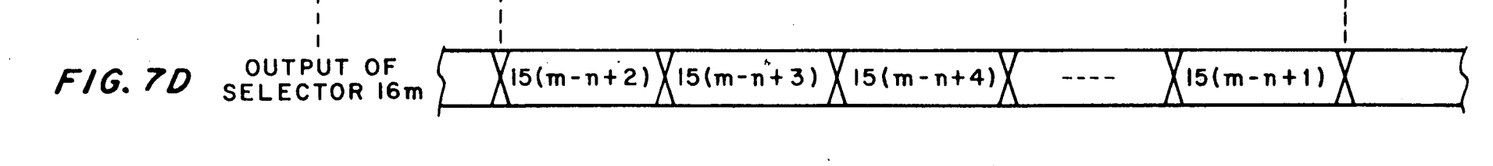

While performing the S/P conversion, as stated above, the S/P converter $11_1$ separates the address from the packet S and delivers it to the associated address filter $12_1$. On detecting the address of the packet S, the address filter $12_1$ identifies one of the outputs $O_1$ to $O_m$ (step S4) to which the packet S is destined. At the same time, the address filter $12_1$ controls the delay buffer $13_1$ so that the packet S is delayed by a required period of time and fed out to the time division line $15_1$.

Specifically, as shown in FIG. 2C, m channels are defined on the time division line $15_1$ (FIG. 1). Each of the channels is allotted the time period t corresponding to the packet length period, after serial-to-parallel conversion. The m channels are associated with the output lines $O_1$ to $O_m$, respectively. Assuming that the address of the packet S designates the output $O_4$, for example, the address filter $12_1$ controls the associated delay buffer $13_1$ so that the packet S having been stored in the delay buffer $13_1$ is outputted when a time slot associated with the output $O_4$ shown in FIG. 2C is reached (steps S5 and S6). The same data may be fed out simultaneous to a plurality of output lines by outputting it repetitively at a plurality of desired channel positions. For example, if address information commanding a simultaneously broadcast is set up beforehand, the address filter $12_1$ will produce the same data on the desired channels every time that it detects the address information.

Each of the m selectors $16_1$ to $16_m$ sequentially selects the time division lines $15_1$ to $15_n$ at the intervals of t so as to store the packets in associated one of the buffers $17_1$ to $17_m$. The packet S is to be fed out to the associated output line. The packets which are so lodged in the individual buffers $17_1$ to $17_m$ are transformed into serial data by the associated P/S converters $18_1$ and $18_m$ in order to be delivered to the output lines $O_1$ to $O_m$. It is noteworthy that all of the n time division lines differ from one another with respect to the above-stated channel positions. This will be described specifically with reference to FIGS. 4A to 4D.

FIGS. 4A to 4D depict channel positions on the individual time division lines $15_1$ to $15_n$ (FIG. 1). As shown, the timing for the packet length period T, which is to be repeated, is sequentially deviated at each line by the time t, with respect to the time division of the preceding line, to the time division line $15_n$. That is, all of the time division lines $15_1$ to $15_n$ are different from one another with respect to the channel positions. Hence, only one channel that corresponds to a certain output exists at the same position on the time axis. At a time $t_1$, for example, a channel corresponding to the output $O_1$ exists on the time division line $15_1$ only. The selectors $16_1$ to $16_m$, therefore, select the inputs in matching relation to the individual channel positions. For example, the selector $16_1$, associated with the output $O_1$ selects the time division line $15_1$ at the time $t_1$ and the time division line $15_2$ at a time $t_2$. Likewise, the selector $16_2$ selects the time division line $15_1$ at the time $t_2$ and the time division line $15_2$ at a time $t_3$. FIGS. 5A to 5D indicate such a relationship of the selection timing in the selectors $16_1$ to $16_m$.

As stated above, only a single time division channel (packet) that should be fed out to a single output exists at any time on all of the time division lines. This is successful in eliminating the conflict of packet. Hence, even when a plurality of packets having the same address arrive at the packet switching system at the same time, they can be fed out to a desired output without being discarded due to conflict or to being inverted in sequence.

Every time one packet S is completed on any one of the inputs $I_1$ to $I_n$, it is delivered to a destined output within the next period T. It follows that each of the delay buffers $13_1$ to $13_n$ needs only a K-bit (one packet) memory area. It will be clear that the buffers $17_1$ to $17_m$ and the P/S converters $18_1$ to $18_m$ can be implemented by K-bit memories and K-bit shift registers, respectively.

As described above, the illustrative embodiment assigns a different repetition timing of the packet length period T to each input. This requires different timing pulses to be generated for and fed to the individual input lines (S/P converters, address filters and delay buffers) and individual output lines (selectors, buffers and P/S converters). Nevertheless, the selectors $16_1$ to $16_m$ need only to switch over in response to the same timing pulses, the period of which is T.

Referring to FIGS. 6A to 6D and FIGS. 7A to 7D, another embodiment of the present invention is shown in which all of the inputs $I_1$ to $I_n$ and time division lines $15_1$ to $15_n$ share the same timing, with respect to the repetition of the period T. In this embodiment, therefore, all the S/P converters $11_1$ to $11_n$ are operated in synchronism. An advantage achievable with such a construction is that a pulse which is indicative of the beginning of the period T can be fed to all the circuits at the same timing, thus, promoting an easy control over the entire system. However, the control over the selectors $16_1$ to $16_m$ is not as easy as with the first embodiment because the order in which the time division lines $15_1$ to $15_n$ is selected differs from one selector to another. Specifically, as shown in FIGS. 7A to 7D, the selector $16_1$ sequentially selects the time division lines $15_1$, $15_2$, $15_3$ and so forth in this order from the beginning of the period T, while the selector $16_2$ selects the time division lines $15_m$, $15_1$, $15_2$ and so forth in this sequence.

What is claimed is:

1. A packet switching network for receiving information packets on a plurality of input lines, each of said packets having a fixed bit length and consisting of data and an address indicative of a destination of said data, switching said packets responsive to said addresses so that said data are sent to desired destinations, and sending said switched packets via a plurality of output lines, said network comprising:

a plurality of time division lines each being associated with a respective one of a plurality of input lines and having a time division multiplex channel, each of the channels being associated with a respective one of a plurality of output lines;

a plurality of serial-to-parallel converting means, each of said serial-to-parallel converting means being associated with a respective one of the input lines for delivering an input packets to an associated one of said time division lines;

a plurality of address filter means, each of said filter means being associated with a respective one of the input lines for identifying one of the output lines to which a packet is destined on a basis of the address of said packet and for indicating a channel position associated with said one output line on an associated one of said time division lines;

a plurality of rearranging means, each rearranging means being associated with a respective one of the input lines for rearranging each packet on a time division multiplex channel in response to an indication from an associated one of said address filter means, said packet being outputted at a particular channel position that is assigned to said packet in response to said rearrangement, and delivering said rearranged packet to an associated one of said time division lines, each of said rearranging means comprising buffer means for temporarily storing an output of an associated one of said serial-to-parallel converting means and, in response to a command from an associated one of said filter means, delivering said stored output to an associated one of said time division lines while delaying said stored output;

a plurality of selector means, each of said selector means being associated with a respective one of the output lines and being connected to a plurality of said time division lines for periodically selecting and outputting packets on associated ones of said time division lines; and a plurality of parallel-to-serial converting means, each of said parallel-to-serial converting means being associated with a respective one of the output lines for delivering the packet selected by the associated one of said selector means;

each of the time division lines having a bus-connection construction for being terminated respectively at corresponding ones of input terminals of all of the selector means to input the same packet to all of the selector means;

all of said time division lines being related with respect to channel positions so that only a single channel that corresponds to one of the output lines exists at any one position on a time division multiplex channel, whereby the packets to be fed out to the same output are prevented from conflicting with each other.

2. A network as claimed in claim 1, wherein each of said address filter means is constructed to deliver the same packet to two or more of the output lines by applying, while said same packet is stored in said buffer means, a cell output command to two or more of said channel positions of said time division lines.

* * * * *